United States Patent
Yourou et al.

(10) Patent No.: US 10,802,502 B2
(45) Date of Patent: Oct. 13, 2020

(54) MOVABLE BODY UTILIZATION SYSTEM, SERVER, AND METHOD FOR UTILIZING MOVABLE BODY

(71) Applicant: TOYOTA JIDOSHA KABUSHIKI KAISHA, Toyota-shi, Aichi-ken (JP)

(72) Inventors: Katsuhiko Yourou, Toyonaka (JP); Naomi Kataoka, Nagoya (JP); Toshiaki Niwa, Okazaki (JP); Yasuhiro Baba, Kamo-gun (JP); Kazuyuki Kagawa, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/135,103

(22) Filed: Sep. 19, 2018

(65) Prior Publication Data
US 2019/0121366 A1 Apr. 25, 2019

(30) Foreign Application Priority Data
Oct. 19, 2017 (JP) .................................. 2017-202586

(51) Int. Cl.
*G05D 1/02* (2020.01)
*G06Q 30/02* (2012.01)

(52) U.S. Cl.
CPC ......... *G05D 1/0276* (2013.01); *G05D 1/0212* (2013.01); *G06Q 30/0283* (2013.01); *G05D 2201/0212* (2013.01)

(58) Field of Classification Search
USPC .......................................................... 701/23
See application file for complete search history.

(56) References Cited

U.S. PATENT DOCUMENTS

| 6,785,607 | B2 | 8/2004 | Watanabe et al. |
| 8,849,494 | B1* | 9/2014 | Herbach ........... B60W 60/0015 |
| | | | 701/24 |
| 10,131,362 | B1* | 11/2018 | Gingrich ........... B60W 50/0098 |
| 10,282,625 | B1* | 5/2019 | Wengreen .......... G01C 21/3415 |

(Continued)

FOREIGN PATENT DOCUMENTS

| CN | 105863351 A | 8/2016 |
| JP | 2015-069594 A | 4/2015 |
| JP | 2015-184243 A | 10/2015 |

OTHER PUBLICATIONS

Google Translation of Korean Patent Application Pub. No. KR101536176B1 that published in 2015 (downloaded Oct. 8, 2019).*

(Continued)

*Primary Examiner* — Jean Paul Cass
(74) *Attorney, Agent, or Firm* — Sughrue Mion, PLLC

(57) ABSTRACT

A movable body utilization system includes: a vehicle configured to perform automated driving; and a server configured to communicate with the vehicle. The server selects the vehicle conforming to a demand of a user who is not an owner of the vehicle when the server receives a utilization application for utilizing the vehicle for a predetermined purpose by the user, the demand including the vehicle utilizable for the predetermined purpose and a utilization fee of the vehicle. Then, the server transmits, to the selected vehicle, an instruction for allowing the user to utilize the vehicle. In accordance with the instruction, the vehicle is configured to move to the user who has made the utilization application.

3 Claims, 11 Drawing Sheets

(56) References Cited

U.S. PATENT DOCUMENTS

| | | | |
|---|---|---|---|
| 10,377,342 B1* | 8/2019 | Wengreen | B60W 50/14 |
| 2003/0046331 A1* | 3/2003 | O'Donnell | G06Q 10/025 |
| | | | 709/201 |
| 2003/0233311 A1* | 12/2003 | Bramnick | G06Q 30/08 |
| | | | 705/37 |
| 2004/0117528 A1* | 6/2004 | Beacher | G06Q 30/0603 |
| | | | 710/111 |
| 2005/0050206 A1* | 3/2005 | Ueda | H04L 12/1863 |
| | | | 709/227 |
| 2005/0186947 A1* | 8/2005 | Miller | H04M 3/42068 |
| | | | 455/414.1 |
| 2014/0156138 A1* | 6/2014 | Klaff | G06F 17/00 |
| | | | 701/33.4 |
| 2018/0373268 A1* | 12/2018 | Antunes Marques Esteves | |
| | | | B60L 53/00 |
| 2019/0121358 A1 | 4/2019 | Niwa et al. | |
| 2019/0121366 A1* | 4/2019 | Yourou | G08G 1/143 |
| 2019/0124301 A1 | 4/2019 | Yoshii et al. | |

OTHER PUBLICATIONS

Google Translation of Japanese Patent Pub. No. JP2015184243A to Kota et al. that was published in 2015. (downloaded on Oct. 8, 2019).*
Office Action for U.S. Appl. No. 16/135,093 dated Sep. 5, 2019.
Office Action dated Mar. 18, 2020 by the USPTO in U.S. Appl. No. 16/135,093.

* cited by examiner

FIG.5

<USER INFORMATION>

| USER ID | REQUEST INFORMATION ||||||| UTILIZATION HISTORY ||
| | UTILIZATION PURPOSE | BUDGET | UTILIZATION START TIME | UTILIZATION END TIME | UTILIZATION START LOCATION | UTILIZATION END LOCATION | VEHICLE ID | UTILIZATION STATE |
|---|---|---|---|---|---|---|---|---|
| U0001 | RESTING | M1 | 12:00 | 13:00 | X1 | X2 | E003 | CURRENTLY UTILIZED |
| U0002 | SMOKING | M2 | 12:30 | 12:50 | Y1 | Y2 | E001 | WAITING FOR DISPATCH |
| U0003 | STUDY | M3 | 15:00 | 17:00 | Z1 | Z2 | E008 | WAITING FOR DISPATCH |
| ... | ... | ... | ... | ... | ... | ... | ... | ... |
| ... | ... | ... | ... | ... | ... | ... | ... | ... |

FIG.6

<VEHICLE INFORMATION>

| VEHICLE ID | OWNER | VEHICLE TYPE | SMOKING HISTORY | FEE (JPY/MINUTE) | UTILIZATION STATE | | | | CURRENT LOCATION | SOC |
|---|---|---|---|---|---|---|---|---|---|---|
| | | | | | CURRENTLY UTILIZED | CURRENTLY TRAVELING AROUND | CURRENTLY STANDBY | NOT UTILIZABLE | | |
| E001 | A | T1 | LESS FREQUENT | C1 | | | ○ | | P1 | 70% |
| E002 | B | T2 | MORE FREQUENT | C2 | | | ○ | | P2 | 80% |
| E003 | C | T3 | PROHIBITED | C3 | ○ | | | | P3 | 60% |
| ... | ... | ... | ... | ... | ... | ... | ... | ... | ... | ... |
| ... | ... | ... | ... | ... | ... | ... | ... | ... | ... | ... |

FIG.10

| VEHICLE No. | SELECTION | VEHICLE TYPE | PERMISSION/ PROHIBITION OF SMOKING | SMOKING HISTORY | FEE (JPY/MINUTE) |
|---|---|---|---|---|---|
| 1 | ☐ | T1 | ○ | LESS FREQUENT | C1 |
| 2 | ■ | T2 | ○ | MORE FREQUENT | C2 |
| 3 | ☐ | T3 | × | NONE | C3 |
| ... | ... | ... | ... | ... | ... |
| ... | ... | ... | ... | ... | ... |

※C3>C1>C2

MOVABLE BODY UTILIZATION SYSTEM, SERVER, AND METHOD FOR UTILIZING MOVABLE BODY

This nonprovisional application is based on Japanese Patent Application No. 2017-202586 filed on Oct. 19, 2017, with the Japan Patent Office, the entire contents of which are hereby incorporated by reference.

BACKGROUND

Field

The present disclosure relates to a movable body utilization system, a server, and a method for utilizing a movable body. Particularly, the present disclosure relates to: a movable body utilization system for allowing a user, who is not an owner of a movable body, to utilize the movable body for a predetermined purpose; a server used for the movable body utilization system; and a method for utilizing the movable body.

Description of the Background Art

In recent years, development of automated driving technique has been progressed rapidly, and services utilizing movable bodies capable of automated driving have been proposed. For example, Japanese Patent Laying-Open No. 2015-69594 discloses a transportation system in which a movable body capable of automated driving is operated as a mobile shop that carries merchandise and travels around in a town.

In this transportation system, a traveling schedule of the movable body serving as the mobile shop is prepared based on user demand information and road information. The created traveling schedule is transmitted to a mobile shop terminal to be operated by an operator of the mobile shop. Accordingly, the movable body can be efficiently utilized as a mobile shop that travels around in the town (see Japanese Patent Laying-Open No. 2015-69594).

In the transportation system described in Japanese Patent Laying-Open No. 2015-69594, the movable body serving as the mobile shop is a subjective entity that travels around in the town based on the user demand information and the road information. On the other hand, the following use case can be considered: a user who is not an owner of a movable body wishes to utilize the movable body for a predetermined purpose (as a smoking room or a resting room). In such a use case, Japanese Patent Laying-Open No. 2015-69594 does not particularly discuss a framework in which a movable body is utilized as an objective entity in accordance with a utilization application from a user.

SUMMARY

The present disclosure has been made to solve the foregoing problem and has an object to provide: a movable body utilization system for allowing a user, who is not an owner of a movable body, to utilize the movable body for a predetermined purpose; a server used for the movable body utilization system; and a method for utilizing the movable body.

A movable body utilization system according to the present disclosure includes: a movable body configured to perform automated driving; and a server configured to communicate with the movable body. The server is configured to perform first and second processes. The first process is a process for selecting, when the server receives a utilization application for utilizing the movable body for a predetermined purpose by a user who is not an owner of the movable body, the movable body conforming to a demand of the user, the demand including the movable body utilizable for the predetermined purpose and a utilization fee of the movable body. The second process is a process for transmitting, to the selected movable body, an instruction for allowing the user to utilize the movable body. The movable body is configured to move to the user in accordance with the instruction.

According to the above configuration, the user and the movable body can be matched in consideration of the utilization purpose of the movable body and the utilization fee of the movable body. Then, the selected movable body is moved to the user and the user can utilize the movable body for the predetermined purpose. As a result, the movable body can be moved to the user and can be utilized as a utilizable space, for example, particularly when spaces in buildings are limited in urban areas or the like, whereby the spaces can be efficiently managed.

The predetermined purpose includes utilizing the movable body as a smoking room.

In this case, when there is a less frequent smoking history of a compartment of the movable body, the utilization fee may be set to be more expensive than the utilization fee when there is a more frequent smoking history of the compartment.

Accordingly, when the user wishes to utilize the movable body as a smoking room, the user and the movable body can be matched in consideration of the utilization fee set according to the smoking history of the movable body.

The first process may include a process for (i) provisionally selecting the movable body utilizable for the predetermined purpose, and (ii) selecting the movable body in response to an approval of the user to the provisionally selected movable body and the utilization fee of the provisionally selected movable body, when the server receives the utilization application.

Accordingly, the user can select a desired movable body by confirming the provisionally selected movable body and the utilization fee thereof.

The first process may include a process for (i) extracting at least one movable body utilizable for the predetermined purpose, (ii) presenting the extracted movable body and a utilization fee of the extracted movable body to the user, and (iii) allowing the user to select the movable body conforming to the demand of the user, when the server receives the utilization application.

Accordingly, the user can select a desired movable body from at least one movable body presented together with its utilization fee.

Further, a server according to the present disclosure includes: a communication device configured to communicate with a movable body configured to perform automated driving; and a processor configured to perform first and second processes. The first process is a process for selecting, when the server receives a utilization application for utilizing the movable body for a predetermined purpose by a user who is not an owner of the movable body, the movable body conforming to a demand of the user, the demand including the movable body utilizable for the predetermined purpose and a utilization fee of the movable body. The second process is a process for transmitting an instruction for allowing the user to utilize the selected movable body, to the movable body via the communication device.

Further, a utilization method according to the present disclosure is a method for utilizing a movable body configured to perform automated driving, the method including: receiving, by a server, a utilization application for utilizing the movable body for a predetermined purpose by a user who is not an owner of the movable body; selecting, by the server, the movable body conforming to a demand of the user, the demand including the movable body utilizable for the predetermined purpose and a utilization fee of the movable body; and transmitting an instruction for allowing the user to utilize the selected movable body, from the server to the movable body; and moving the movable body to the user in accordance with the instruction.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 shows a configuration of data stored in a user information DB of the server.

FIG. 6 shows a configuration of data stored in a vehicle information DB of the server.

FIG. 10 shows exemplary information of each vehicle as presented on a user terminal.

DESCRIPTION OF THE PREFERRED EMBODIMENTS

Figure 1:
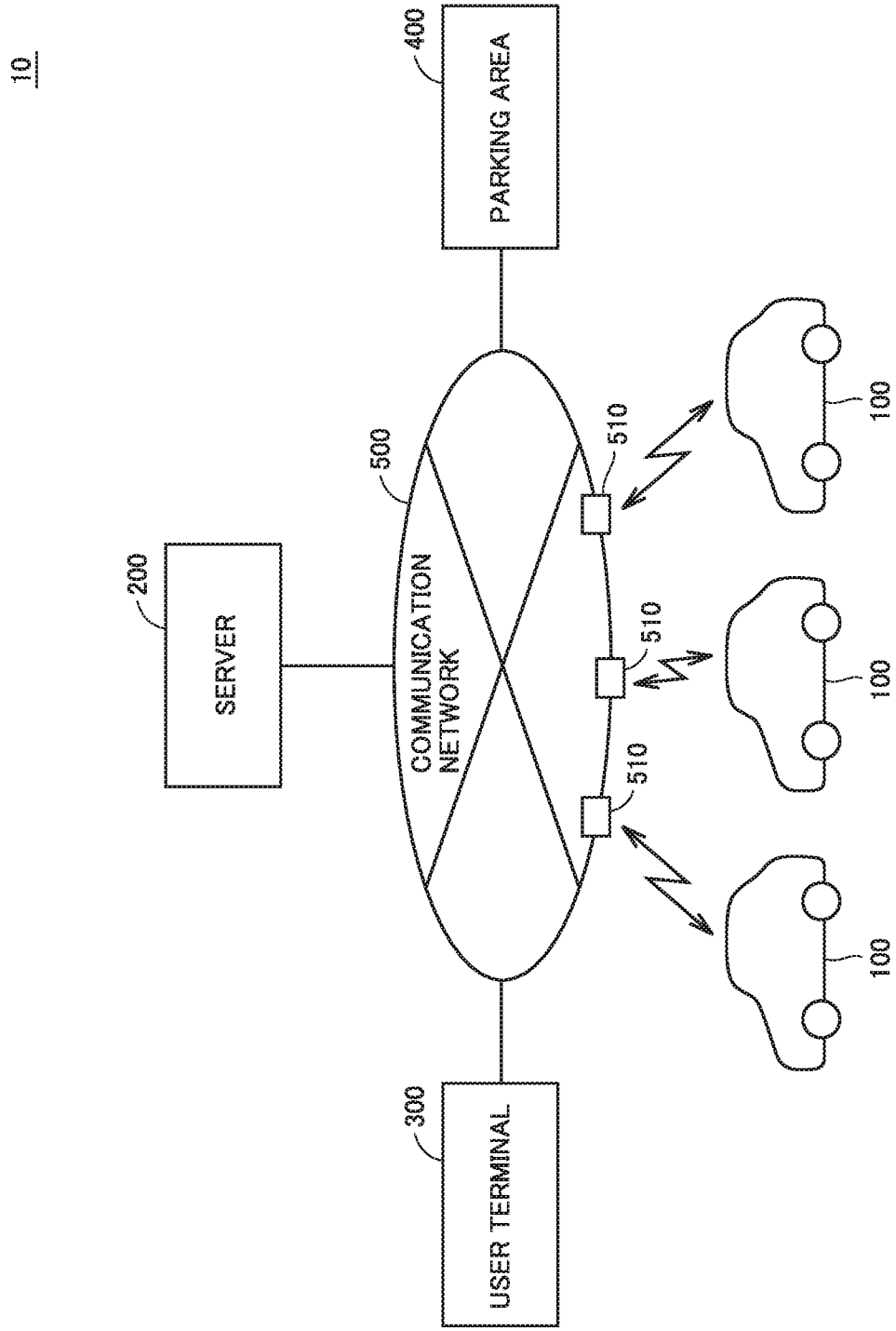
FIG. 1 schematically shows an entire configuration of a movable body utilization system.

The following describes embodiments of the present disclosure with reference to figures in detail. It should be noted that the same or corresponding portions are given the same reference characters and are not described repeatedly.

First Embodiment

<System Configuration>

FIG. 1 schematically shows an entire configuration of a movable body utilization system 10 in accordance with the present embodiment. With reference to FIG. 1, movable body utilization system 10 includes a plurality of electrically powered vehicles (hereinafter, also simply referred to as "vehicles") 100, a server 200, a user terminal 300, and a parking area 400. Each vehicle 100, server 200, user terminal 300, and parking area 400 are configured to communicate with one another through a communication network 500 such as the Internet or a telephone line. It should be noted that each vehicle 100 is configured to send and receive information to and from a base station 510 of communication network 500 through wireless communication.

Vehicle 100 is a movable body configured to perform automated driving. Vehicle 100 is configured to generate driving power for traveling using electric power from a power storage device mounted thereon as described below with reference to FIG. 2. In this first embodiment, vehicle 100 is further configured to allow the power storage device to be charged using electric power supplied from a power supply external to the vehicle, and vehicle 100 is an electric vehicle, a so-called plug-in hybrid vehicle, or the like, for example. It should be noted that vehicle 100 is not necessarily limited to such a vehicle having a power storage device that can be charged using a power supply external to the vehicle, and may be a hybrid vehicle that does not have a function of charging the power storage device using a power supply external to the vehicle.

Server 200 communicates with each vehicle 100, user terminal 300, and parking area 400 through communication network 500, and sends and receives various types of information to and from each vehicle 100, user terminal 300 and parking area 400. Operations of server 200 will be described in detail later.

User terminal 300 is a terminal of a user who is not an owner of vehicle 100 and who wishes to utilize vehicle 100 for a predetermined purpose. Examples of user terminal 300 include a mobile terminal such as a smartphone. The user who wishes to utilize vehicle 100 for the predetermined purpose can make an application to utilize vehicle 100 from user terminal 300. It should be noted that examples of the predetermined purpose include various purposes such as utilizations as a smoking room, a resting room (such as a tearoom), a study room, a napping space, viewing of movie or video, a recreation room, a place for social interaction, and the like.

Parking area 400 is a facility for parking vehicle 100 while vehicle 100 is not utilized. Parking area 400 may be a dedicated parking area, a vacant parking space of an apartment registered in advance, or the like. Moreover, parking area 400 may be provided with a power supply facility for supplying charging power to vehicle 100.

Figure 2:
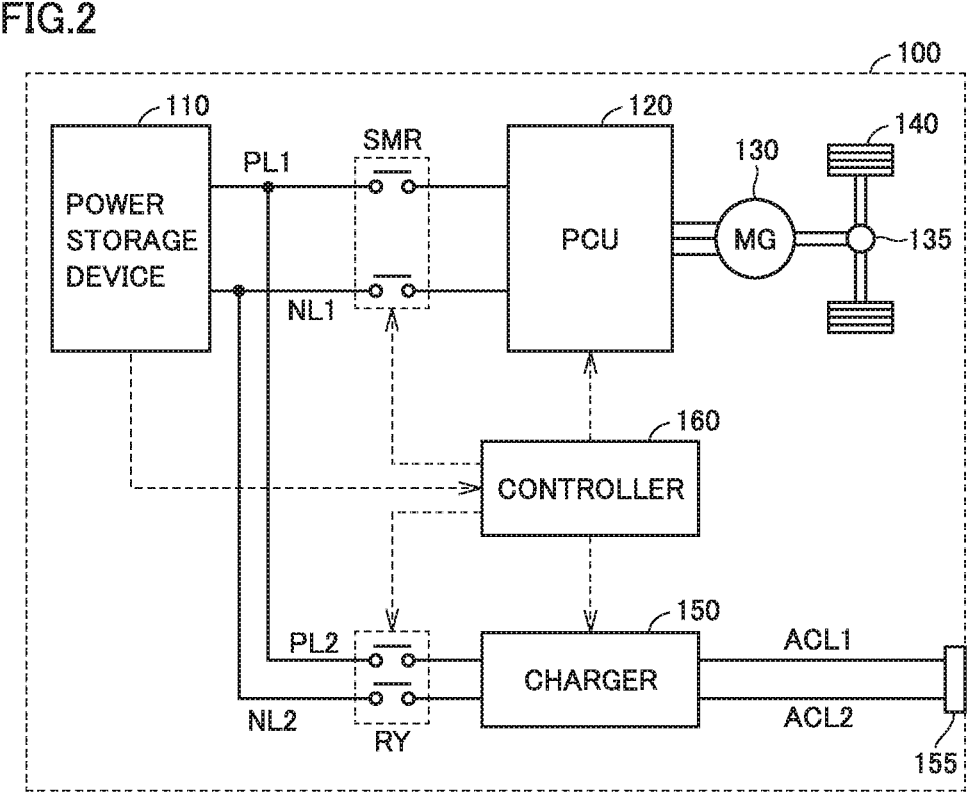
FIG. 2 shows a configuration of a vehicle.

FIG. 2 shows a configuration of vehicle 100. With reference to FIG. 2, vehicle 100 includes power storage device 110, a system main relay SMR, a PCU (Power Control Unit) 120, a motor generator 130, a power transmission gear 135, and driving wheels 140. Moreover, vehicle 100 further includes a charger 150, an inlet 155, a charging relay RY, and a controller 160.

Power storage device 110 is a power storage component configured to be chargeable/dischargeable. Power storage device 110 is configured to include a secondary battery such as a lithium ion battery or a nickel-hydrogen battery, or include a power storage element such as an electric double layer capacitor, for example. Via system main relay SMR, power storage device 110 supplies PCU 120 with electric power for generating driving power of vehicle 100. Further, power storage device 110 stores electric power generated by motor generator 130. Power storage device 110 outputs, to controller 160, detection values of voltage and current of power storage device 110 detected by a sensor not shown in the figure.

PCU 120 is a driving device for driving motor generator 130, and is configured to include a power converting device such as a converter, an inverter, or the like (all not shown). PCU 120 is controlled by a control signal from controller 160 and converts DC power received from power storage device 110 into AC power for driving motor generator 130.

Motor generator 130 is an AC rotating electrical machine, such as a permanent-magnet type synchronous motor including a rotor having a permanent magnet embedded therein. Output torque from motor generator 130 is transmitted to driving wheels 140 via power transmission gear 135, which is constituted of a speed reducer and a power split device. In this way, vehicle 100 travels. Moreover, motor generator 130 is capable of generating electric power using rotation power of driving wheels 140 when vehicle 100 operates for braking. The electric power thus generated is converted by PCU 120 into charging power for power storage device 110.

It should be noted that in a hybrid vehicle including an engine (not shown) in addition to motor generator 130, required vehicle driving power is generated by operating the engine and motor generator 130 cooperatively. In this case, power storage device 110 can be charged using electric power generated by rotation of the engine.

Charger 150 is connected to power storage device 110 through charging relay RY. Moreover, charger 150 is connected to inlet 155 by power lines ACL1, ACL2. Charger 150 converts electric power supplied from the power supply, which is external to the vehicle and electrically connected to inlet 155, into electric power with which power storage device 110 can be charged.

Controller 160 includes an ECU (Electronic Control Unit), various sensors, and a navigation device, a communication module, and the like (not shown in FIG. 2), receives signals from a sensor group, outputs a control signal to each device, and controls vehicle 100 and each device. Controller 160 performs various types of control for performing automated driving of vehicle 100 (such as driving control, braking control, and steering control). Controller 160 generates control signals for controlling PCU 120, a steering device not shown in the figure, charger 150, and the like. Moreover, controller 160 receives detection values of voltage and current of power storage device 110, and calculates a state of charge (hereinafter, also referred to as "SOC") of power storage device 110 based on these detection values.

Figure 3:
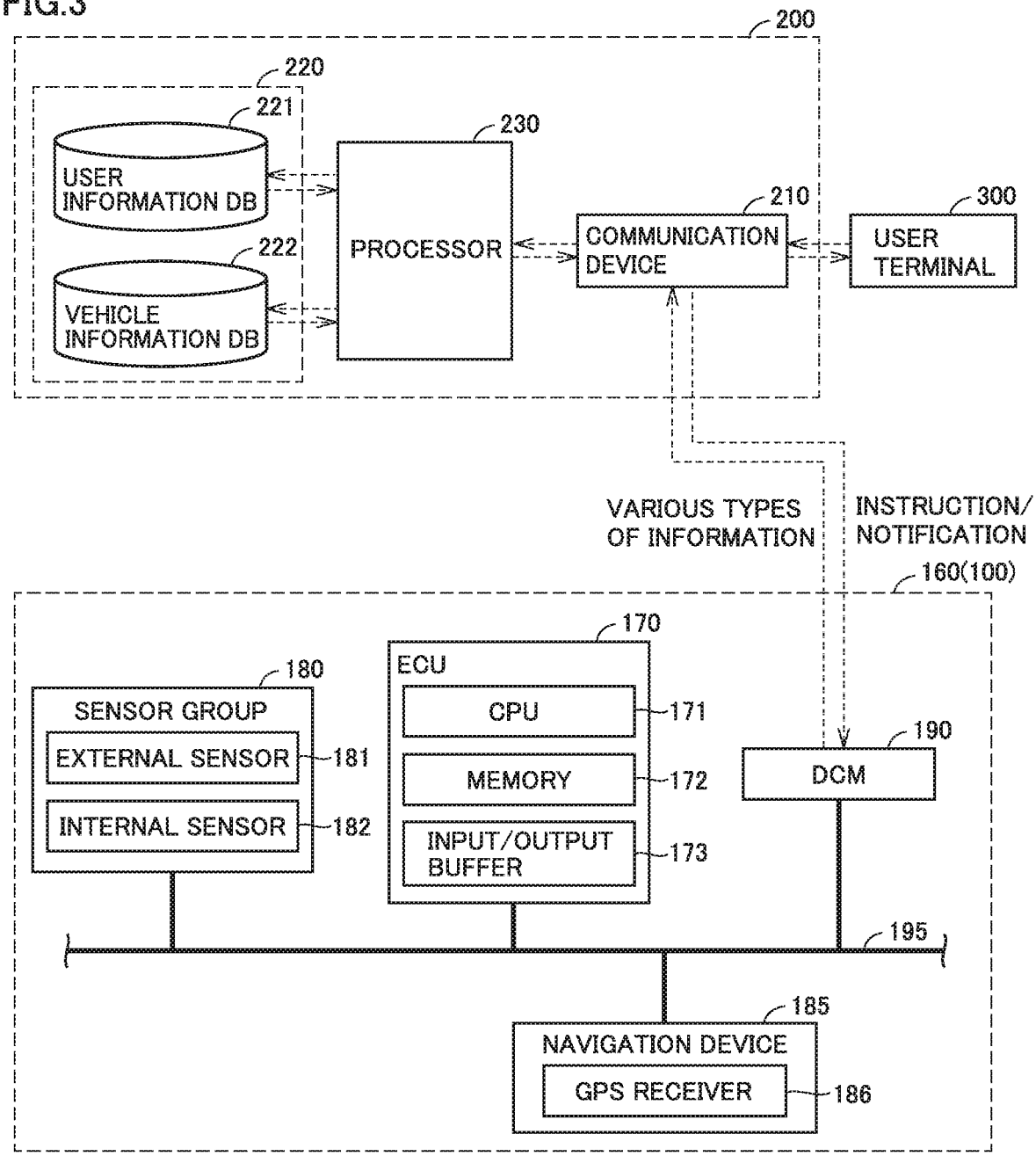
FIG. 3 shows configurations of a controller of the vehicle and a server more in detail.

FIG. 3 shows configurations of controller 160 of vehicle 100 and server 200 more in detail. With reference to FIG. 3, controller 160 of vehicle 100 includes an ECU 170, a sensor group 180, a navigation device 185, and a communication module 190. ECU 170, sensor group 180, navigation device 185, and communication module 190 are connected to one another via an in-vehicle wired network 195 such as a CAN (Controller Area Network).

ECU 170 is configured to include a CPU (Central Processing Unit) 171, a memory 172, and an input/output buffer 173. In response to a signal from each sensor of sensor group 180, ECU 170 controls devices to bring vehicle 100 into a desired state. For example, ECU 170 performs various types of control for implementing the automated driving of vehicle 100 by controlling PCU 120 (FIG. 2) serving as a driving device and the steering device (not shown).

It should be noted that the term "automated driving" refers to driving in which driving operations of vehicle 100 such as acceleration, deceleration, and steering are performed without driving operations by a driver. Specifically, this vehicle 100 is configured to perform full-automated driving defined as "Level 5". That is, in the automated driving by ECU 170, a driver does not need to ride on and operate the vehicle under all the situations.

Therefore, controller 160 includes sensor group 180 to detect situations inside and outside vehicle 100. Sensor group 180 includes: an external sensor 181 configured to detect a situation outside vehicle 100; and an internal sensor 182 configured to detect information corresponding to a traveling state of vehicle 100 and detect a steering operation, an accelerating operation, and a braking operation.

External sensor 181 includes a camera, a radar, a LIDAR (Laser Imaging Detection And Ranging), and the like, for example (all not shown). The camera captures an image of a situation outside vehicle 100 and outputs, to ECU 170, captured-image information regarding the situation outside vehicle 100. The radar transmits electric wave (for example, millimeter wave) to surroundings of vehicle 100 and receives electric wave reflected by an obstacle to detect the obstacle. Then, the radar outputs, to ECU 170, a distance to the obstacle and a direction of the obstacle as obstacle information regarding the obstacle. The LIDAR transmits light (typically, ultraviolet rays, visible rays, or near infrared rays) to surroundings of vehicle 100 and receives light reflected by an obstacle to measure a distance to the reflecting point and detect the obstacle. The LIDAR outputs, to ECU 170, the distance to the obstacle and a direction of the obstacle as obstacle information, for example.

Internal sensor 182 includes a vehicle speed sensor, an acceleration sensor, a yaw rate sensor, and the like, for example (all not shown). The vehicle speed sensor is provided at a wheel of vehicle 100 or a drive shaft that is rotated together with the wheel, detects a rotating speed of the wheel, and outputs vehicle speed information including the speed of vehicle 100 to ECU 170. The acceleration sensor includes: a forward/backward acceleration sensor configured to detect acceleration in a forward/backward direction of vehicle 100; and a lateral acceleration sensor configured to detect lateral acceleration of vehicle 100, for example. The acceleration sensor outputs acceleration information including both the accelerations to ECU 170. The yaw rate sensor detects a yaw rate (rotation angle speed) around the vertical axis of the center of gravity of vehicle 100. The yaw rate sensor is, for example, a gyro sensor, and outputs yaw rate information including the yaw rate of vehicle 100 to ECU 170.

Navigation device 185 includes a GPS receiver 186 configured to specify a location of vehicle 100 based on electric waves from satellites (not shown). Navigation device 185 performs various types of navigation processes of vehicle 100 using the location information (GPS information) of vehicle 100 specified by GPS receiver 186. Specifically, navigation device 185 calculates a traveling route (expected traveling route or target route) from the current location of vehicle 100 to a destination based on GPS information of vehicle 100 and a road map data stored in the memory (not shown), and outputs information of the target route to ECU 170. It should be noted that during the utilization of vehicle 100 by the user, navigation device 185 notifies the target route to the user by way of presentation on a display and audio output from a speaker (both not shown).

Communication module 190 is an in-vehicle DCM (Data Communication Module), and is configured to perform bidirectional data communication with communication device 210 of server 200 via communication network 500 (FIG. 1).

Server 200 includes a communication device 210, a storage device 220, and a processor 230. Communication device 210 is configured to perform bidirectional data communication with communication module 190 of vehicle 100 and user terminal 300 via communication network 500 (FIG. 1).

Storage device 220 includes a user information database (DB) 221 and a vehicle information database (DB) 222. User information DB 221 stores information of a user who utilizes this movable body utilization system 10. A user who wishes to utilize movable body utilization system 10 can utilize movable body utilization system 10 by registering himself/herself as a member in advance, and information of the user who has registered as a member is stored in user information DB 221. A data configuration of user information DB 221 will be described later.

Vehicle information DB 222 stores information of each vehicle 100 utilized in this movable body utilization system 10. Each vehicle 100 to be utilized in movable body utilization system 10 can be utilized in movable body utilization system 10 through a registration procedure in advance. Information of vehicle 100 thus registered is stored in vehicle information DB 222. A data configuration of vehicle information DB 222 will also be described later.

When server 200 receives a utilization application for vehicle 100 from user terminal 300, processor 230 associates information regarding the utilization application (utilization purpose, utilization time, utilization location, and the like) with the information of the user of user terminal 300, and stores it in user information DB 221. Then, processor 230 makes reference to the vehicle information stored in vehicle information DB 222 to select a vehicle 100 conforming to the demand of the user, and notifies a vehicle dispatch request to the selected vehicle 100 to move to the user who has made the utilization application.

<Explanation of Movable Body Utilization in Movable Body Utilization System 10>

A use case can be considered in which a user who is not an owner of vehicles 100 wishes to utilize a vehicle 100 for a predetermined purpose (as a smoking room or a resting room). Particularly, if vehicle 100 can be moved to the user and can be utilized as a utilizable space when spaces in buildings are limited in urban areas or the like, the spaces can be efficiently managed.

In this first embodiment, there is employed a system in which: when a user who is not an owner of vehicles 100 makes a utilization application for utilizing a vehicle 100 for a predetermined purpose, matching between the user and vehicles 100 is performed and a vehicle 100 selected through the matching is moved to the user. The matching between the user and vehicles 100 is performed in consideration of the user's purpose of utilizing vehicle 100 and the utilization fee of vehicle 100. Accordingly, a vehicle 100 conforming to the demand of the user is moved to the user and the user can utilize vehicle 100 for the predetermined purpose. As a result, vehicle 100 can be moved to the user and can be utilized as a utilizable space, for example, particularly when spaces in buildings are limited in urban areas or the like, whereby the spaces can be efficiently managed.

The following describes details of control in movable body utilization system 10 according to the first embodiment with reference to an exemplary case where the predetermined purpose is to utilize vehicle 100 as a smoking room.

Figure 4:
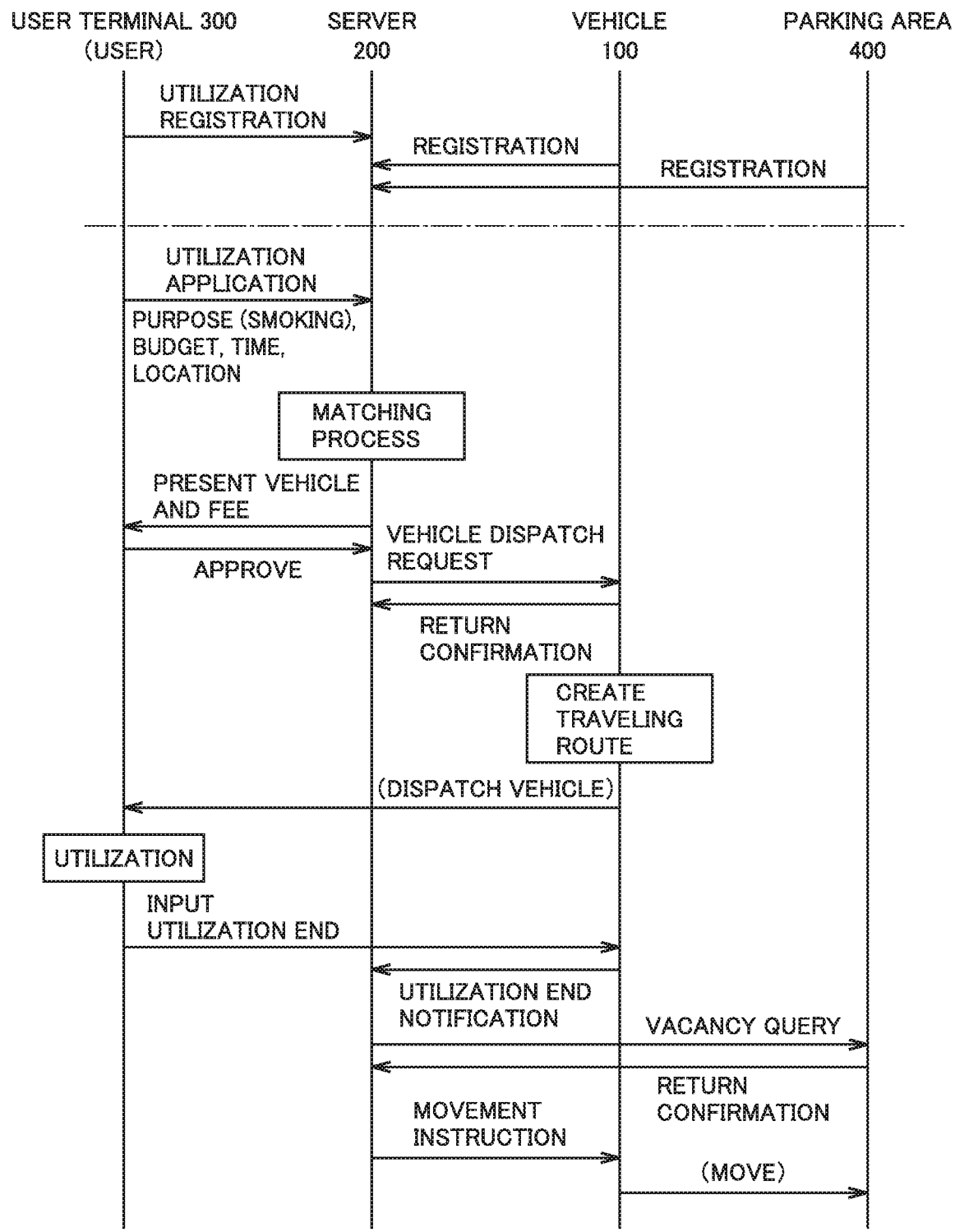
FIG. 4 is a sequence diagram showing exchange of information among respective elements of the movable body utilization system according to the first embodiment.

FIG. 4 is a sequence diagram showing exchange of information among respective elements (vehicle 100, server 200, user terminal 300, and parking area 400) of movable body utilization system 10 according to the first embodiment. With reference to FIG. 4, the user who is to utilize movable body utilization system 10 needs to make a utilization application for the system in advance. For example, utilization registration information is transmitted from user terminal 300 to server 200. Moreover, vehicles 100 and parking areas 400 to be utilized in movable body utilization system 10 also need to be registered in advance. Pieces of information of vehicles 100 and parking areas 400 are registered in server 200.

The user who is to utilize movable body utilization system 10 makes a utilization application from user terminal 300. When information (information that specifies the user, utilization purpose (smoking), budget, utilization start time, utilization end time, utilization start location, utilization end location, and the like) required for the utilization application is input to user terminal 300, utilization application information is transmitted from user terminal 300 to server 200.

When server 200 receives the utilization application information from user terminal 300, server 200 assumes the received utilization application information as request information from the user, associates it with the ID of the user, and stores it in user information DB 221. Then, server 200 makes reference to vehicle information DB 222 to select a vehicle 100 conforming to the request information (matching process).

When the user's utilization purpose is to utilize vehicle 100 as a smoking room, matching is performed between the user and vehicles 100 (details will be described below) in this matching process in consideration of the utilization purpose (smoking) and the utilization fees of vehicles 100 dependent on smoking histories (more/less frequent smoking histories) in compartments of vehicles 100.

Server 200 transmits, to user terminal 300, information including vehicle 100 selected by the matching process and the utilization fee thereof so as to present it to the user. Then, when server 200 receives a notification of approval from user terminal 300, server 200 transmits, to vehicle 100 selected by the matching process, a vehicle dispatch request (instruction for allowing the user to utilize vehicle 100 in accordance with the utilization application) to move to the user.

When vehicle 100 receives the vehicle dispatch request from server 200, vehicle 100 returns, to server 200, a signal indicating the reception confirmation of the vehicle dispatch request. This reception confirmation includes a result of determination as to whether or not the vehicle can be dispatched in accordance with the vehicle dispatch request. When vehicle 100 can be dispatched, vehicle 100 creates, based on the request information received together with the vehicle dispatch request from server 200, a traveling route from the current location to the designated utilization start location, and a traveling route to be taken during the utilization by the user.

Then, vehicle 100 is moved to the user by moving along the created traveling route in order to reach the utilization start location at the utilization start time. Then, when vehicle 100 reaches the user, the user utilizes vehicle 100 for the desired purpose as applied (for example, utilizes as a smoking room).

During the utilization of vehicle 100 by the user, vehicle 100 travels along the created traveling route by automated driving. By traveling vehicle 100 during the utilization by the user, a plurality of vehicles 100 can be avoided from being parked in a concentrated manner. It should be noted that after starting the utilization of vehicle 100, vehicle 100 may be moved to a nearby parking area and may be parked therein.

The user who ends utilizing vehicle 100 inputs an utilization end to vehicle 100. When the utilization end is input to vehicle 100, vehicle 100 transmits a utilization end notification to server 200. It should be noted that the utilization end for vehicle 100 may be input to user terminal 300 and may be transmitted from user terminal 300 to vehicle 100 and server 200.

When server 200 receives the utilization end notification with regard to vehicle 100, server 200 transmits a vacancy query to parking area 400 to inquire whether or not there is a vacant parking space for vehicle 100 to stand by. When there is a vacant parking space for vehicle 100 to stand by, parking area 400 returns, to server 200, a signal indicating to confirm that there is a vacant space. Then, server 200 transmits a movement instruction to vehicle 100 to move to parking area 400, and vehicle 100 is moved to parking area 400 in accordance with the received movement instruction.

It should be noted that the vacancy query for parking area 400 may be made in vehicle 100. In this case, when it is determined to park in parking area 400, a notification indicating that it is determined to park in parking area 400 is provided from vehicle 100 or parking area 400 to server 200.

FIG. 5 shows a configuration of the data stored in user information DB 221 of server 200. With reference to FIG. 5, the user ID is an identification number for specifying the user. The request information based on the utilization application from user terminal 300 and the utilization history of vehicle 100 are associated with the user ID of the user who has made the utilization application.

The request information includes data of the utilization purpose, the budget, the utilization start time, the utilization end time, the utilization start location, and the utilization end location, which have been input upon making the utilization application from user terminal 300. The budget indicates the upper limit of the utilization fee or utilization unit fee (JPY/minute) accepted by the user, for example. It should be noted that in this example, when the utilization application is received from user terminal 300, the data thereof is stored in the request information associated with the user ID of the user who has made the utilization application, and when the utilization of vehicle 100 is ended, the data of the request information is deleted (or may be transferred to and stored in a different location).

The utilization history includes: the vehicle ID of vehicle 100 selected based on the request information associated with the user ID; and data of a utilization state (currently utilized, waiting for dispatch, or the like). As one example, it is indicated that a vehicle 100 having a vehicle ID of E003 is selected for a user having a user ID of U0001 and the user of U0001 is currently utilizing vehicle 100 of E003 for a purpose of resting.

FIG. 6 shows a configuration of the data stored in vehicle information DB 222 of server 200. With reference to FIG. 6, the vehicle ID is an identification number for specifying vehicle 100, and various types of data are associated with the vehicle ID, such as the owner, vehicle type, smoking history, fee (JPY/minute), utilization state, current location, SOC, and the like of vehicle 100.

The smoking history indicates a (high/low) frequency of smoking or prohibition of smoking in the compartment of the vehicle in past. The fee (JPY/minute) indicates an utilization unit fee for vehicle 100. This fee is in connection with the smoking history. That is, when the grades of respective vehicles 100 are the same, a fee C1 of a vehicle 100 having a less frequent smoking history is set to be more expensive than a fee C2 of a vehicle 100 having a more frequent smoking history, and a fee C3 of a vehicle 100 having a smoking history indicating "smoking prohibited" is set to be more expensive than fee C1 (C3>C1>C2).

The utilization state includes data indicating that vehicle 100 is currently being utilized by the user who has made the utilization application, vehicle 100 is traveling around, vehicle 100 is in a standby state, or vehicle 100 is not utilizable. It should be noted that the expression "traveling around" indicates that vehicle 100 is not currently being utilized and is traveling around on a predetermined route to seek for a user who is supposed to utilize vehicle 100. The expression "not utilizable" corresponds to a case where due to decreased SOC, the power storage device of vehicle 100 is currently being charged using a power supply external to the vehicle in a parking area or the like, for example.

The current location indicates the current location of vehicle 100. The SOC indicates the current SOC of power storage device 110 mounted on vehicle 100. The current location and the SOC are regularly transmitted from each registered vehicle 100 to server 200 moment by moment, and are stored in vehicle information DB 222.

Figure 7:
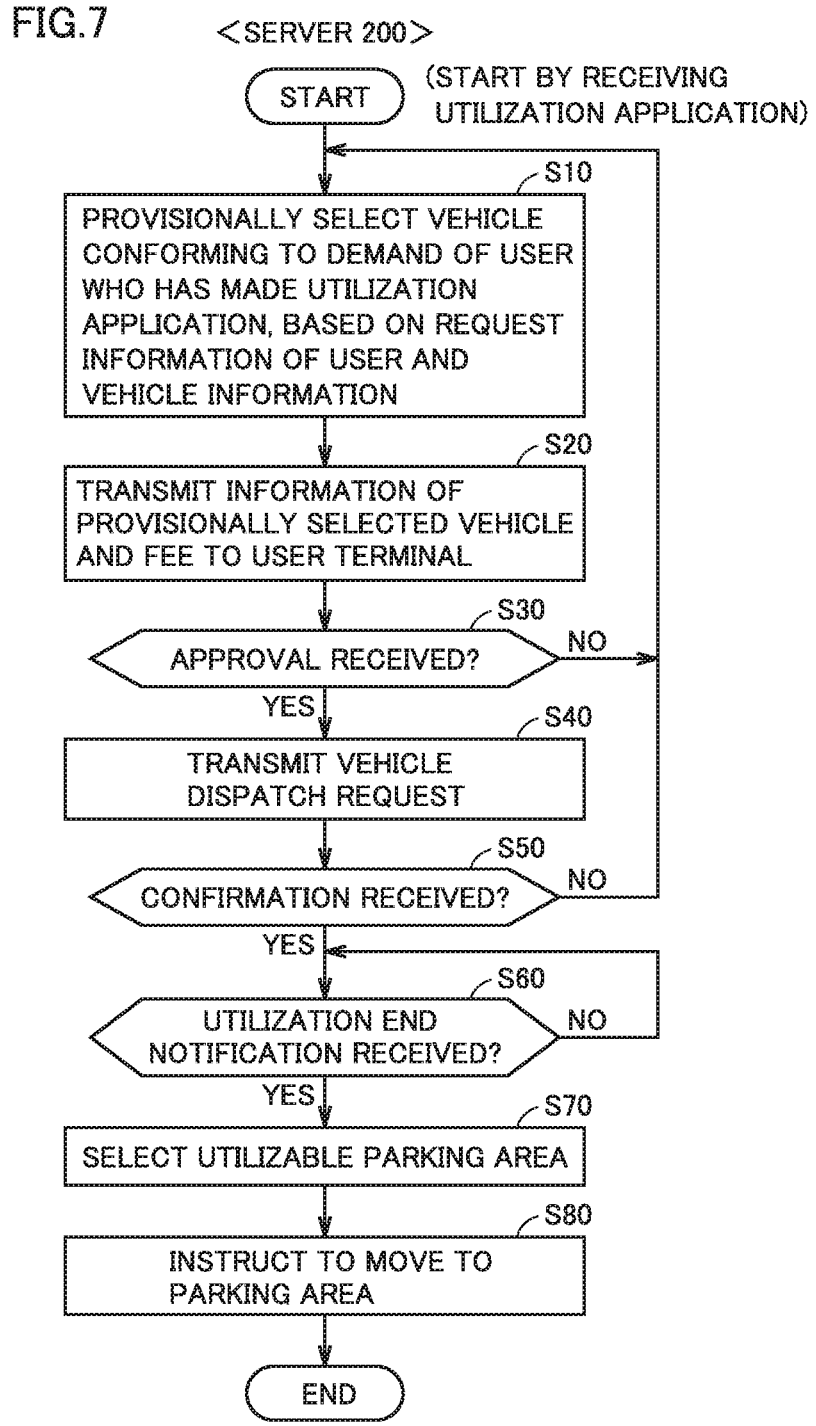
FIG. 7 is a flowchart for illustrating a procedure of processes performed by a processor of the server.

FIG. 7 is a flowchart for illustrating a procedure of processes performed by processor 230 of server 200. The series of processes shown in this flowchart are started when a utilization application is received from user terminal 300.

With reference to FIG. 7, when server 200 (processor 230) receives the utilization application from user terminal 300, server 200 assumes, as request information from the user, information regarding the received utilization application, associates it with the user ID of the user, and stores it in user information DB 221 (FIG. 5). Then, server 200 makes reference to user information DB 221 and vehicle information DB 222 (FIG. 6) to provisionally select a vehicle 100 conforming to the demand of the user, based on the request information (utilization purpose, budget, time, location, and the like) of the user and the information (smoking history, fee, utilization state, current location, SOC, and the like) of each vehicle 100 registered in vehicle information DB 222 (step S10).

As an example, with reference to FIG. 5 and FIG. 6 again, when the utilization purpose of the user (user having the user ID of "U0002") is "smoking", vehicles having smoking histories not indicating "smoking prohibited" (vehicles having the vehicle IDs of "E001" and "E002") are extracted. Further, based on the budget of the user (budget "M2" for the user ID of "U0002"), a vehicle (vehicle having the vehicle ID of "E001") is provisionally selected which is relatively expensive between the extracted vehicles and which has a less frequent smoking history.

With reference to FIG. 7 again, server 200 transmits, to user terminal 300, the information of vehicle 100 provisionally selected in step S10 and the utilization fee thereof (step S20). Then, server 200 determines whether or not a signal indicating approval to the provisionally selected vehicle 100 is received from user terminal 300 (step S30).

When no approval signal is received from user terminal 300 (NO in step S30), the process is returned to step S10 and another vehicle 100 is provisionally selected. For example, a less expensive vehicle having a more frequent smoking history (vehicle having the vehicle ID of "E002" in FIG. 6) is provisionally selected.

When the approval signal is received from user terminal 300 in step S30 (YES in step S30), server 200 assumes that the matching between the user and vehicles 100 is completed, and transmits a vehicle dispatch request to the selected vehicle 100 to move to the user (step S40). Then, server 200 determines whether or not a signal indicating reception confirmation of the vehicle dispatch request is received from vehicle 100 (step S30).

When no confirmation signal from vehicle 100 is received (NO in step S30), it is determined that vehicle 100 cannot be dispatched and the process is returned to step S10 to provisionally select another vehicle 100. It should be noted that also when the confirmation signal from vehicle 100 indicates that vehicle 100 is not utilizable, the process is returned to step S10 to provisionally select another vehicle 100.

When the confirmation signal (indicating that it is utilizable) is received from vehicle 100 in step S30 (YES in step S30), server 200 thereafter stands by until the utilization of vehicle 100 by the user is ended. It should be noted that also during this standby, respective pieces of information of current location and SOC regularly transmitted from vehicle 100 are stored in vehicle information DB 222.

Then, when the user who ends utilizing vehicle 100 inputs a utilization end in vehicle 100 and server 200 receives a utilization end notification from vehicle 100 (YES in step S40), server 200 selects a parking area 400 that can be utilized by vehicle 100 for standby (step S50). Specifically, when server 200 transmits a vacancy query to parking area 400 to inquire whether or not there is a vacant parking space and receives a signal indicating to confirm that there is a vacant space from parking area 400, server 200 selects parking area 400 as a parking area that can be utilized by vehicle 100.

Then, server 200 transmits an movement instruction to vehicle 100 to move to parking area 400 (step S60). Accordingly, vehicle 100 moves to parking area 400 in accordance with the movement instruction received from server 200, and stands by in parking area 400 to wait for a next utilization application. It should be noted that when parking area 400 has a charging facility and a utilization application to utilize the charging facility has been made in advance, power storage device 110 may be charged using the charging facility during the standby in parking area 400.

Figure 8:
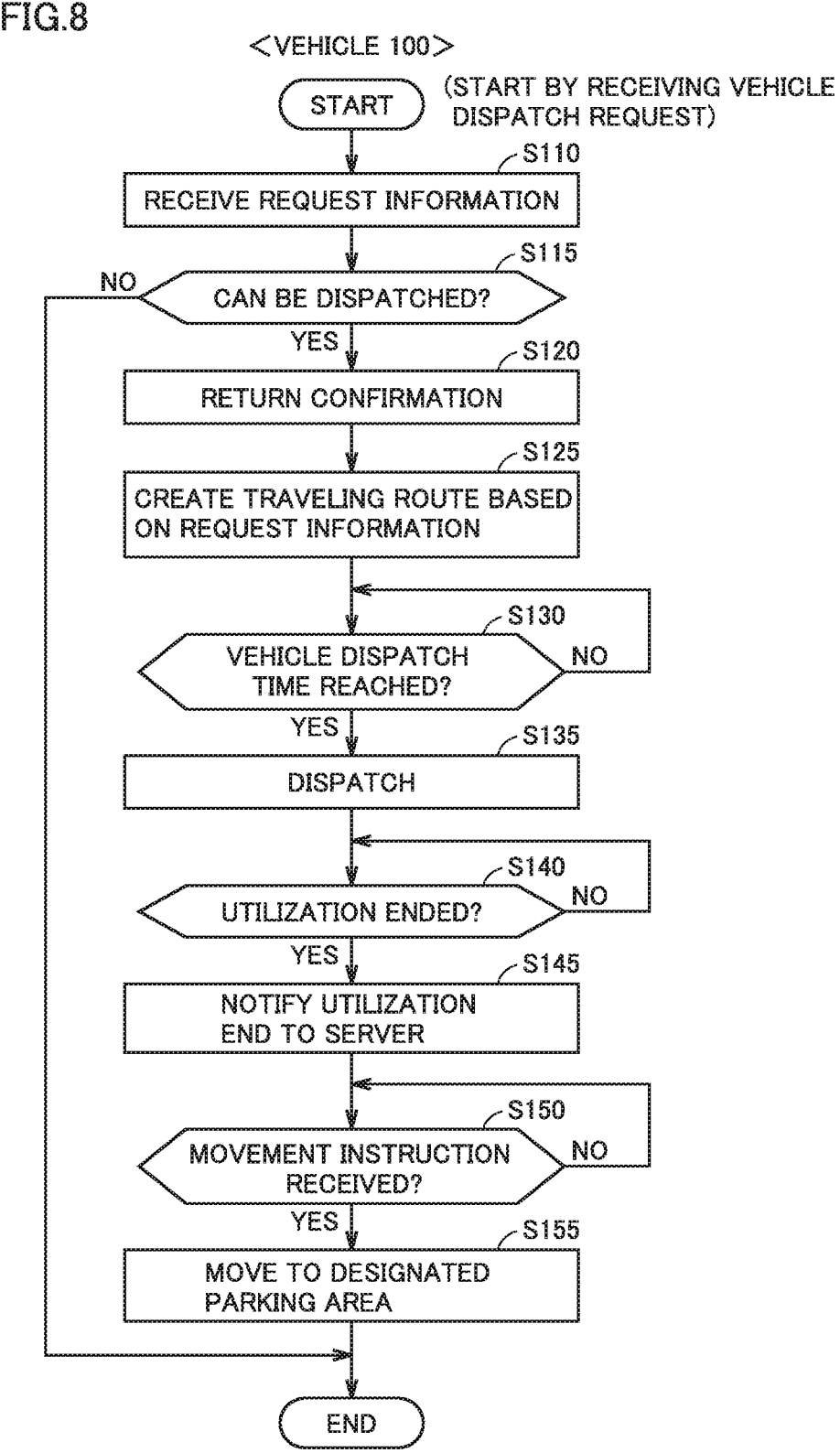
FIG. 8 is a flowchart for illustrating a procedure of processes performed by a controller of the vehicle.

FIG. 8 is a flowchart for illustrating a procedure of processes performed by controller 160 of vehicle 100. The series of processes shown in this flowchart are started when a vehicle dispatch request is received from server 200.

With reference to FIG. 8, when controller 160 of vehicle 100 receives the vehicle dispatch request from server 200, controller 160 receives the request information transmitted from server 200 together with the vehicle dispatch request (step S110). This request information is request information regarding this utilization application and stored in user information DB 221 shown in FIG. 5.

Next, controller 160 determines whether or not the vehicle can be dispatched to the user who has made the utilization application (step S115). For example, it is determined that the vehicle cannot be dispatched when the SOC of power storage device 110 has been decreased due to previous utilization or when power storage device 110 is being charged using a charging facility but the SOC has not been sufficient yet.

When it is determined that the vehicle cannot be dispatched in step S115 (NO in step S115), controller 160 transfers the process to the end without performing subsequent processes. It should be noted that although not shown particularly, also in this case, controller 160 returns, to server 200, a signal indicating that the vehicle cannot be dispatched in response to the vehicle dispatch request. When it is determined that the vehicle can be dispatched in step S115 (YES in step S115), controller 160 returns, to server 200, a signal indicating to confirm the vehicle dispatch request (step S120).

Next, based on the request information received together with the vehicle dispatch request in step S110, controller 160 creates the traveling route to the utilization start location for the user and the traveling route to be taken during the utilization by the user (step S125). It should be noted that for the traveling route to be taken during the utilization by the user, controller 160 create: a route for traveling around its neighborhood; a route for moving vehicle 100 to a nearby parking area, parking vehicle 100 therein, and allowing vehicle 100 to reach the utilization end location at the utilization end time; and the like, for example.

When the vehicle dispatch time calculated based on the utilization start time is reached (step S130), controller 160 controls vehicle 100 to dispatch vehicle 100 to the utilization start location along the traveling route created in step S125 (step S135). When vehicle 100 reaches the user, vehicle 100 is utilized by the user for the desired utilization purpose (for example, utilized as a smoking room).

Then, when the user who ends utilizing vehicle 100 inputs an utilization end (YES in step S140), controller 160 transmits a utilization end notification to server 200 (step S145).

Then, controller 160 determines whether or not a movement instruction to move to a parking area is received from server 200 (step S150). When parking area 400 is selected in server 200 in response to the utilization end notification and the movement instruction to move to parking area 400 is received (YES in step S150), controller 160 controls vehicle 100 to move to designated parking area 400 in accordance with the received movement instruction (step S155).

As described above, according to the first embodiment, the user and vehicle 100 can be matched in consideration of the user's utilization purpose of vehicle 100 and the utilization fee of vehicle 100. Then, the selected vehicle 100 is moved to the user and the user can utilize vehicle 100 for the predetermined purpose. As a result, vehicle 100 can be moved to the user and can be utilized as a utilizable space, for example, particularly when spaces in buildings are limited in urban areas or the like, whereby the spaces can be efficiently managed.

Moreover, in this first embodiment, when there is a less frequent smoking history of the compartment of vehicle 100, the utilization fee of vehicle 100 is set to be more expensive than the utilization fee when there is more frequent smoking history. Accordingly, when the user wishes to utilize vehicle 100 as a smoking room, the user and vehicle 100 can be matched in consideration of the utilization fee set according to the smoking history of vehicle 100.

Moreover, in this first embodiment, a vehicle 100 is provisionally selected in accordance with the utilization application, and the provisionally selected vehicle 100 and the utilization fee thereof are approved by the user, thereby selecting vehicle 100. Accordingly, the user can select desired vehicle 100 by confirming the provisionally selected vehicle 100 and the utilization fee thereof.

Second Embodiment

In the first embodiment above, vehicle 100 conforming to the demand of the user is provisionally selected in server 200, and is presented to the user (user terminal 300). In this second embodiment, when a utilization application is made from the user, a utilizable vehicle 100 (or a plurality of utilizable vehicles 100) is presented, and the user selects a desired vehicle from the presented vehicle(s) 100, thereby selecting vehicle 100 conforming to the demand of the user.

The entire configuration of the movable body utilization system according to this second embodiment is the same as that of movable body utilization system 10 shown in FIG. 1 according to the first embodiment.

Figure 9:
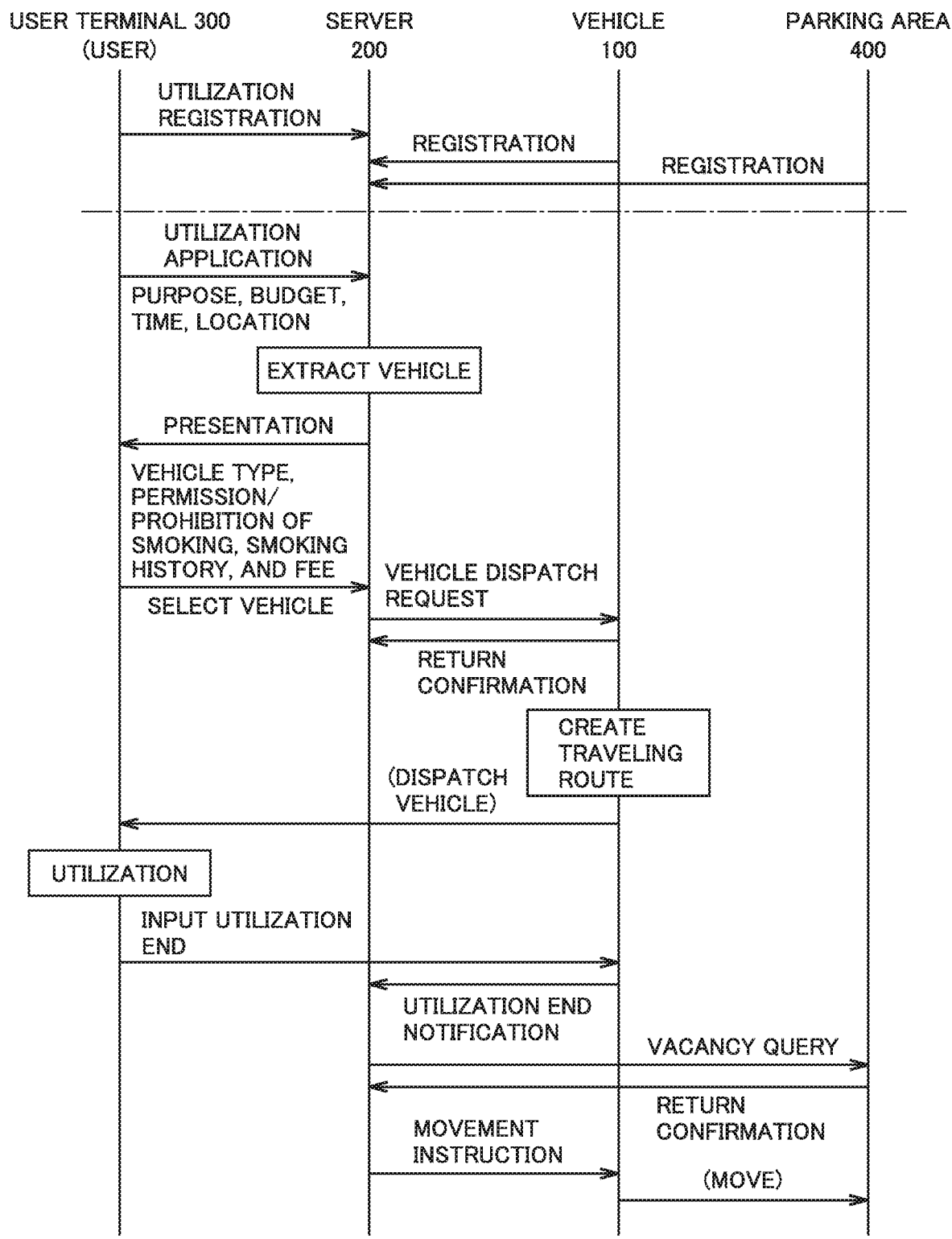
FIG. 9 is a sequence diagram showing exchange of information among respective elements of a movable body utilization system according to a second embodiment.

FIG. 9 is a sequence diagram showing exchange of information among respective elements (vehicle 100, server 200, user terminal 300, and parking area 400) of movable body utilization system 10 according to the second embodiment. With reference to FIG. 9, as with the sequence shown in FIG. 4 in the first embodiment, the user who is to utilize movable body utilization system 10 needs to make utilization registration in advance and vehicle 100 and parking area 400 also need to be registered in advance.

As with the first embodiment, the user who is to utilize movable body utilization system 10 makes a utilization application from user terminal 300. When information (information that specifies the user, utilization purpose, budget, utilization start time, utilization end time, utilization start location, utilization end location, and the like) required for the utilization application is input to user terminal 300, the above-described utilization application information is transmitted from user terminal 300 to server 200.

When server 200 receives the utilization application information from user terminal 300, server 200 extracts, from vehicle information DB 222, a vehicle 100 conforming to the utilization condition. A plurality of vehicles 100 may be extracted. Then, server 200 transmits the information of each extracted vehicle 100 to present it on user terminal 300. The information of each vehicle 100 includes information such as vehicle type, permission/prohibition of smoking, smoking history, utilization fee, and the like.

The user selects a desired vehicle 100 from vehicle(s) 100 presented on user terminal 300. For example, when the utilization purpose is to utilize as a smoking room, the user can select a desired vehicle 100 in consideration of the utilization purpose (smoking) and the utilization fee of vehicle 100 dependent on the smoking history (more/less frequent smoking history) in the compartment of vehicle 100.

Then, when server 200 receives, from user terminal 300, a notification that the vehicle has been selected, server 200 transmits, to the selected vehicle 100, a vehicle dispatch request (instruction for allowing the user to utilize vehicle 100 in accordance with the utilization application) to move to the user. It should be noted that the subsequent sequence is the same as the sequence shown in FIG. 4 in the first embodiment and therefore will not be repeatedly described.

FIG. 10 shows exemplary information of each vehicle 100 presented on user terminal 300. With reference to FIG. 10, the vehicle type, permission/prohibition of smoking, smoking history, fee (JPY/minute), and the like are presented for each vehicle. As with the first embodiment, the fee is in connection with the smoking history. That is, when the grades of respective vehicles 100 are the same, a fee C1 of a vehicle No. "1" having a less frequent smoking history is set to be more expensive than a fee C2 of a vehicle No. "2" having a more frequent smoking history, and a fee C3 of a vehicle No. "3" having a smoking history indicating "none" is set to be more expensive than fee C1 (C3>C1>C2).

The user can select a desired vehicle 100 by checking the check box of the desired vehicle in a selection column. It should be noted that FIG. 10 shows an example in which vehicle 100 with the vehicle No. "2" is selected.

Figure 11:
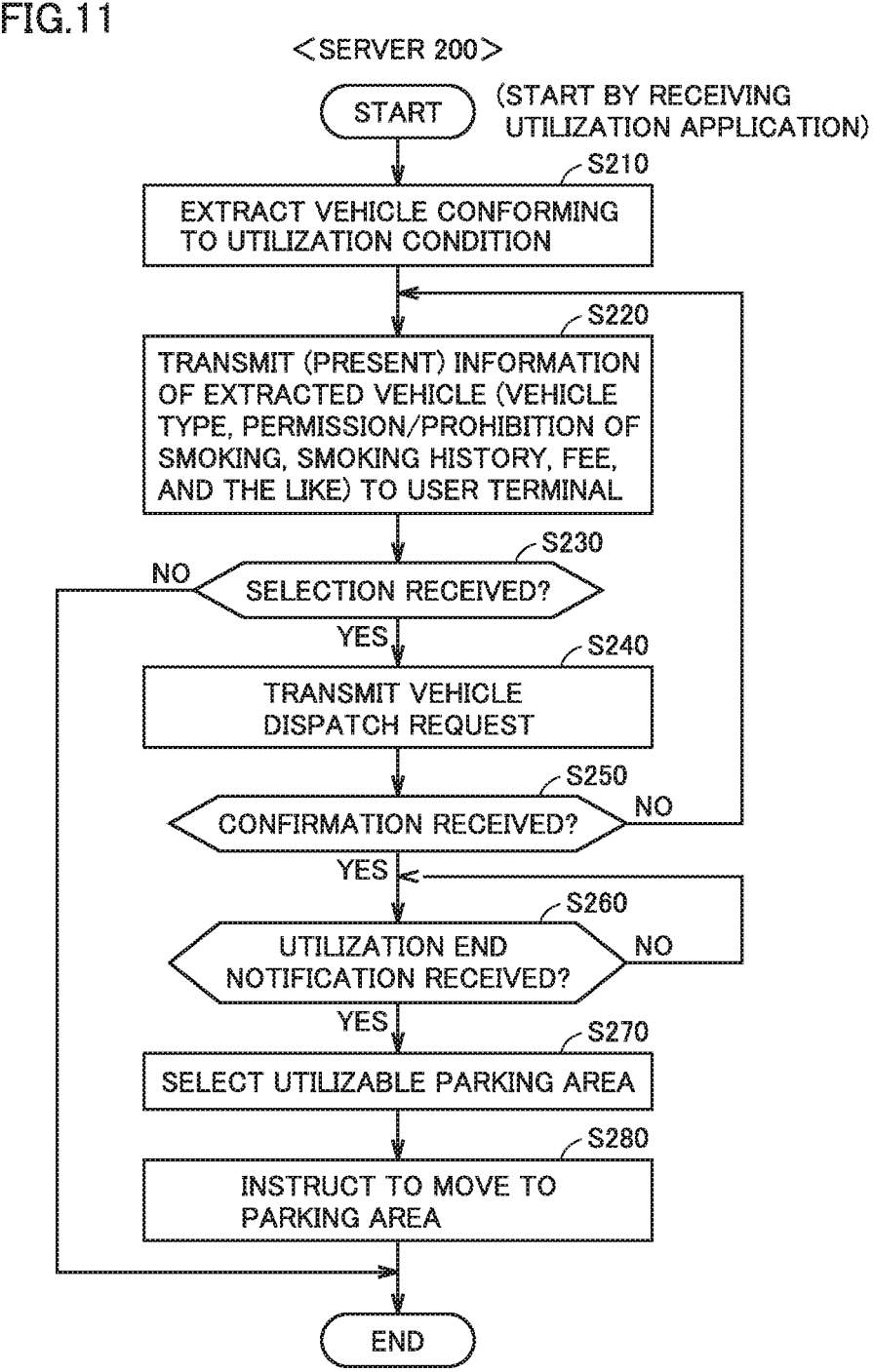
FIG. 11 is a flowchart for illustrating a procedure of processes performed by a processor of a server in the second embodiment.

FIG. 11 is a flowchart for illustrating a procedure of processes performed by processor 230 of server 200 in the second embodiment. The series of processes shown in this flowchart are started when a utilization application is received from user terminal 300.

With reference to FIG. 11, when server 200 (processor 230) receives the utilization application from user terminal 300, server 200 assumes, as request information from the user, information regarding the received utilization application, associates it with the user ID of the user, and stores it in user information DB 221 (FIG. 5). Then, server 200 extracts a vehicle 100 conforming to the utilization condition (purpose, time, location, and the like) from vehicle information DB 222 (step S210). A plurality of vehicles 100 may be extracted.

Next, server 200 transmits, to user terminal 300, information (vehicle type, permission/prohibition of smoking, smoking history, fee and the like) of each vehicle 100 extracted in step S210 (step S220). The information of each vehicle 100 transmitted to user terminal 300 is presented on user terminal 300.

Then, server 200 determines whether or not a signal indicating that the user has selected vehicle 100 is received from user terminal 300 (step S230). When such a selection signal is not received (NO in step S230), server 200 transfers the process to the end without performing the subsequent processes.

When the selection signal from user terminal 300 is received in step S230 (YES in step S230), server 200 assumes that matching between the user and vehicle(s) 100 is completed, and transmits a vehicle dispatch request to the selected vehicle 100 to move to the user (step S240).

It should be noted that the processes from step S250 to step S280 are respectively the same as those from step S50 to step S80 in FIG. 7 and therefore will not be described repeatedly.

Moreover, although not shown particularly, processes performed by controller 160 of vehicle 100 having received the vehicle dispatch request from server 200 in this second embodiment are the same as those in the first embodiment and therefore will not be described repeatedly.

As described above, in this second embodiment, a vehicle 100 (or a plurality of vehicles 100) utilizable for a predetermined purpose is extracted in response to a utilization application. Then, the extracted vehicle(s) 100 and the utilization fee(s) thereof are presented to the user and the user selects a vehicle 100 conforming to the demand of the user. Accordingly, the user can select a desired vehicle 100 from at least one vehicle 100 presented together with its utilization fee.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A movable body utilization system comprising:
a movable body configured to perform automated driving; and
a server configured to communicate with the movable body, wherein
the server is configured to perform
a first process for selecting, when the server receives a utilization application for utilizing the movable body for a predetermined purpose by a user who is not an owner of the movable body, the movable body conforming to a demand of the user, the demand including the movable body utilizable for the predetermined purpose and a utilization fee of the movable body, and a second process for transmitting, to the selected movable body, an instruction for allowing the user to utilize the movable body, and the movable body is configured to move to the user in accordance with the instruction, the predetermined purpose includes utilizing the movable body as a smoking room, when there is a less frequent smoking history of a compartment of the movable body, the utilization fee is set to be more expensive than the utilization fee when there is a more frequent smoking history of the compartment, and the first process includes a process for (i) extracting at least one movable body utilizable for the predetermined purpose, (ii) presenting the extracted movable body and the utilization fee of the extracted movable body to the user, and (iii) allowing the user to select the movable body conforming to the demand of the user, when the server receives the utilization application.

2. A server comprising:

a communication device configured to communicate with a movable body configured to perform automated driving; and a processor configured to perform first and second processes, wherein the first process is a process for selecting, when the server receives a utilization application for utilizing the movable body for a predetermined purpose by a user who is not an owner of the movable body, the movable body conforming to a demand of the user, the demand including the movable body utilizable for the predetermined purpose and a utilization fee of the movable body, and the second process is a process for transmitting an instruction for allowing the user to utilize the selected movable body, to the movable body via the communication device, the predetermined purpose includes utilizing the movable body as a smoking room, when there is a less frequent smoking history of a compartment of the movable body, the utilization fee is set to be more expensive than the utilization fee when there is a more frequent smoking history of the compartment, and the first process includes a process for (i) extracting at least one movable body utilizable for the predetermined purpose, (ii) presenting the extracted movable body and the utilization fee of the extracted movable body to the user, and (iii) allowing the user to select the movable body conforming to the demand of the user, when the server receives the utilization application.

3. A method for utilizing a movable body configured to perform automated driving, the method comprising:

receiving, by a server, a utilization application for utilizing the movable body for a predetermined purpose by a user who is not an owner of the movable body;

selecting, by the server, the movable body conforming to a demand of the user, the demand including the movable body utilizable for the predetermined purpose and a utilization fee of the movable body;

transmitting an instruction for allowing the user to utilize the selected movable body, from the server to the movable body; and moving the movable body to the user in accordance with the instruction, wherein the predetermined purpose includes utilizing the movable body as a smoking room, when there is a less frequent smoking history of a compartment of the movable body, the utilization fee is set to be more expensive than the utilization fee when there is a more frequent smoking history of the compartment, and the selecting the movable body includes (i) extracting at least one movable body utilizable for the predetermined purpose, (ii) presenting the extracted movable body and the utilization fee of the extracted movable body to the user, and (iii) allowing the user to select the movable body conforming to the demand of the user, when the server receives the utilization application.

* * * * *